United States Patent Office 3,605,907
Patented Sept. 20, 1971

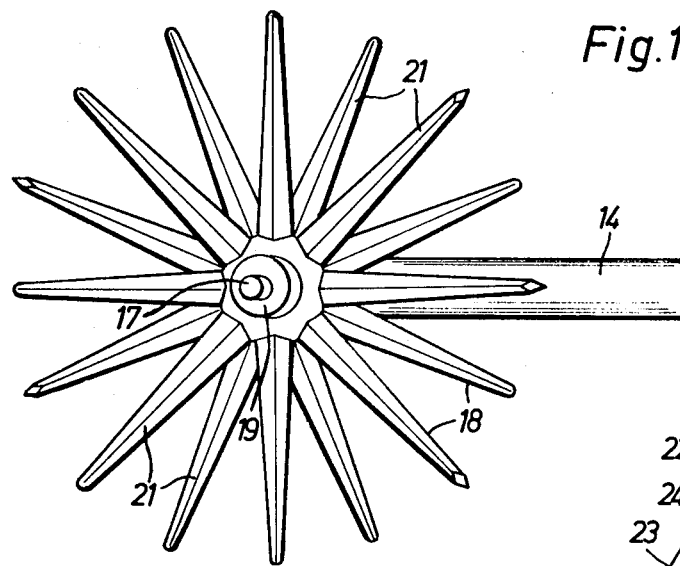
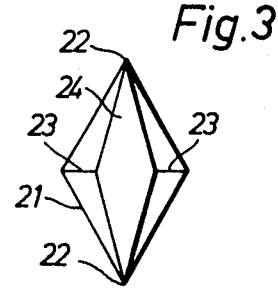
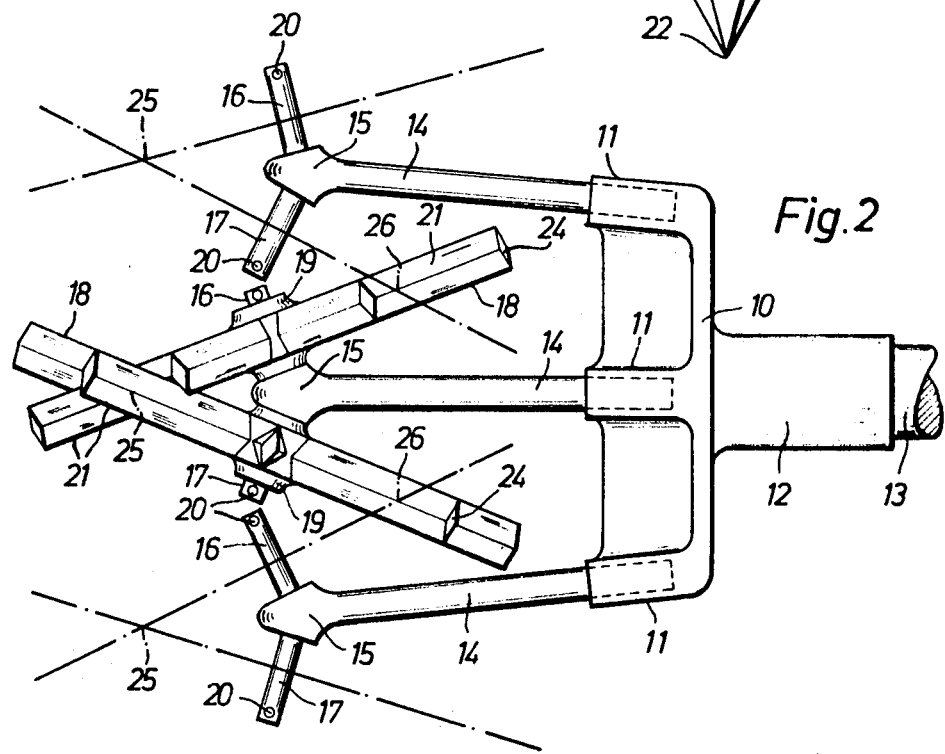

1

3,605,907
HAND TOOL FOR COMMINUTING SOIL
Walter Schuring, 41 Breite Str., 4800 Bielefeld, Germany; Hans vom Braucke, 27 Karl Str., 4973 Vlotho, Germany; and Manfred vom Braucke, 259 Theesener Str., 4801 Vilsendorf, Germany
Filed July 3, 1969, Ser. No. 838,956
Int. Cl. A01b 1/04, 1/14
U.S. Cl. 172—378
4 Claims

ABSTRACT OF THE DISCLOSURE

A hand tool for comminuting soil, especially for loosening, cutting and crumbling soil for agricultural or horticultural purposes comprising comminuting tools rotatably mounted at an angle relative to one another on bearing heads and arranged side by side with comminuting tools meshing with one another and forming intersecting regions located alternately on both sides of the bearing heads.

---

The present invention relates to a hand tool for breaking up soil, more especially for loosening, cutting and crumbling soil for agricultural or horticultural purposes, provided with comminuting members rotatably mounted on bearing heads.

There is a considerable disadvantage in known hand tools for comminuting lumps of soil in that they work the soil in strips and hence leave strip-like portions of the soil untended.

It is an object of the present invention to provide an improved hand tool for comminuting soil which is of simple structure.

It is a further object of the invention to provide a simple hand tool which is readily manipulated.

A further object is to provide a hand tool which is easy to assemble and hence permitting individual components to be readily changed.

A further object of the invention is to provide a hand tool which cultivates the ground substantially over the full surface of the working width.

A further object of the device resides in that it is self-cleaning during operation.

A further object of the hand tool of the invention consists in that during the soil cultivation operation it readily penetrates the soil with the points of its tool and loosens the soil without the expenditure of great effort on the part of the operator.

A further object of the invention is that the hand tool comminutes the soil in a shear-like manner.

According to the invention a hand tool for comminuting soil, especially for loosening, cutting and crumbling soil for agricultural or horticultural purposes comprises comminuting tools rotatably mounted at an angle relative to one another on bearing heads and arranged side by side with comminuting tools meshing with one another and forming intersecting regions located alternately on both sides of the bearing heads.

The invention will be described further, by way of example, with reference to the accompanying drawings, in which:

FIG. 1 is a perspective of a hand tool for breaking up soil;

FIG. 2 is a plan view of the hand tool of FIG. 1 with two pairs of comminuting tools being removed; and FIG. 3 is an end view of a tine of the comminuting tool.

A hand tool for comminuting soil, more especially for loosening, crumbling, cutting or the like operations for agricultural or horticultural purposes, comprises a forked head 10 which is composed of three rigidly interconnected receiving members 11 arranged in side by side spaced relationship and a forked tube 12 arranged centrally adjacent members 11 to receive a handle 13. The receiving members 11 laterally adjacent the central forked tube 12 are outwardly inclined.

Fixing levers 14 may be inserted in receiving members 11 and fixed in position by means of screws or the like. The outer free ends of the fixing levers 14 are each formed into bearing bodies 15 and together with levers 14 form a bearing head from which project two bearing axles 16 and 17. The bearing axles 16 and 17 lie in a common plane relative to the fixing levers 14 and are arranged at an equal angle relative to the longitudinal axes of the levers 14.

A comminuting tool 18 is rotatably mounted on each bearing axle 16 and 17 of the fixing levers 14 and engages around the bearing axles 16 and 17 by means of a boss 19 which may be located, for example, by a split-pin inserted through bore 20.

Each comminuting tool 18 is provided with eight tines 21 which project radially outwards from the boss 19 and are spread evenly over the circumference of the boss. The form and size of the tines 21 is preferably identical in each comminuting tool 18, and as shown are rhomboidal in cross-section (diamond shaped) and are so arranged on the boss 19 that their longitudinal axis (long corner dimension) extends parallel to the axis of rotation and the transverse axis extending at right angles thereto (short corner dimension) is arranged in the medial tine region at right angles to the axis of rotation.

Lateral edges 22 of the tine extend on the longitudinal axis of the tine cross-section, and the upper and lower longitudinal edge 23 extends on the transverse axis.

The side faces of each tine 21 taper uniformly from the fixing point of the tines 21 with the boss 19, towards the free end, each taper, however, being such that the two lateral edges 22 are provided extending in parallel over the whole length of the tine, whilst the upper and lower longitudinal edge 23 converge diagonally towards one another and hence their distance apart diminishes toward the free end of the tine (see FIG. 3). This taper provides the tines 21 with an equal width in a longitudinal direction and a decreasing height in a transverse direction.

The end face of each tine 21 flattened by the taper has an arcuate cross-sectional area 24 from one lateral edge 22 to the other, which extends in the longitudinal direction of the longitudinal axis of the tine.

The comminuting tools 18 rotatably mounted on the adjacent bearing axles 16 and 17 of fixing levers 14 with their tines 21 mesh with clearance from one another (see FIG. 2), so that the tines 21 intersect in the edge region of the comminuting tool 18. The intersecting region of the comminuting tools 18 is thus always provided opposite the fixing lever 14, i.e. in the outside free region of the comminuting tool 18.

The comminuting tools 18 arranged in pairs on the fixing levers 14 in the intersection of the tines 21 form a cutting point 25, whereby further intersections 25 are formed with each further arrangement in pairs of the comminuting tools 18. Furthermore the spacing of the fixing levers 14 on the forked head 10 is such that the comminuting tools 18 of one fixing lever also mesh in the region of the fixing levers 14 (see FIG. 2) with clearance with the comminuting tools 18 of the adjacent fixing levers 14 and hence additionally form intersections 26.

The intersections 25 and 26 provide a cutting action during the comminution of the soil, such that lumps of soil or clay wedged between the tines 21 are cut up by the tines 21 in the region of the lateral edges 22 acting as cutting edges. In one pair of comminuting tools one intersection is provided, in each further pair two further intersections result, so that, for example, with three pairs of comminuting tools five intersections 25 and 26 are provided.

The hand tool in accordance with the present invention is operated by rolling engagement of the comminuting tools 18 whereby the device is moved by hand with the handle 13 over the soil; the comminuting tools being rotated on contact with the soil and caused to move in rolling engagement over the soil. A favourable form of the tines (pointed or lancet-shaped) results in the tines 21 readily piercing the ground and causing it to be loosened and split into lumps. The distal terminal ends of intersecting tines of oppositely inclined tines of paired implements substantially prevent the hand tool from yielding sideways—i.e. the x-shape offers support against sideward toppling movement of the handle in either of opposite sideward directions and thereby enables a stable downward and forward thrush on the handle by the operator, while concurrently cutting up of the soil at right angles to the direction of feed is obtained.

The vertical arrangement of the tines 21 relative to their direction of rotation (axis of rotation) on the one hand provides a ready engaging in the soil and on the other hand results in the later being readily and favourably cut up.

At the intersection points 25 and 26 obtained by the inclining of the comminuting tools 18, the lumps or mass of soil settled between the tines 21, are subjected to further comminuting by the cutting action. The relative transverse movement of the soil to be comminuted is determined by the setting angle of the comminuting tools 18 and results from the angle between plane of rotation and translation.

The number of comminuting tools 18 arranged is optional; likewise the setting angle of the comminuting tools 18 may vary. It is preferable to mount the comminuting tools 18 at an angle of about 45° relative to one another; the angle, however, may be smaller or larger, but it is preferable to select the angle so that meshing of the comminuting tools 18 is maintained.

The comminuting tools 18 are simply and quickly detached from the forked head 10, first removing the fixing lever 14 supporting a pair of comminuting tools 18 from the forked head 10 and then removing the individual tools 18 from the bearing axles 16 and 17. The expedient arrangement of two comminuting tools 18 on a fixing lever 14 permits this unit to be used as an independent working implement for minor comminuting jobs.

The hand tool in accordance with the invention is distinguished by its considerable simplicity, easy handling, favourable method of operation and manifold application.

It is within the scope of the invention to manufacture such a hand tool also in larger dimensions and to arrange it on a working bar of an agricultural tractor, so that comminution of this soil can be effected mechanically.

The cross-section of the tines 21 may also be different, such as oval, circular, polygonal or the like, and the tines 21 may be provided with a cross-section of equal size over their whole length (e.g. cylindrical).

It is furthermore within the scope of the invention to form two bearing heads 14 and 15 and to arrange them so that they can be fitted with a comminuting tool 18 each of which mesh in an intersecting point 25 and 26.

The favourable arrangement of the comminuting tools 18 in favourable manner provides a self-cleaning effect of the hand tool, since the meshing tines 21 remove soil adhering to the comminuting tools 18 when rotating during operation.

We claim:
1. A manual soil cultivator for loosening, cutting and crumbling of agricultural and horticultural soil, comprising:
   (a) an implement handle;
   (b) bearing means mounted on said handle;
   (c) paired comminuting rotatable-wheel-type implements located substantially side by side, each implement comprising a central axis rotatably mounted on said bearing means, and tines arranged as rays extending radially outwardly from said axis, said tines of one of paired implements intersecting with the plane of rotation of and between tines of the other implement of each paired implements;
   (d) said bearing means being of and inverted-V shape defining an obtuse angle relative to said handle, and each one of said comminuting implements being rotatable with said tines extending in a substantially upright position of up to about 45 degrees relative to the other one of said paired implements;
   (e) said intersecting tines meshing with adjacent tines of a paired implement such that a first shearing intersection is formed effective in comminuting sod lumps and in self-cleaning between consecutive tines of each implement of said paired implements;
   (f) tines of adjacent implements of adjacent pairs of said paired implements intersecting at a second intersection between said pairs at a site nearer said handle than and at a position opposite from said first intersection relative to said central axis; and
   (g) the tines of said paired comminuting implements each having lateral edges of substantially angular cross-section defining a cutting edge on each of opposite faces of each tine such that at each of said first and second intersections a shearing action is obtainable upon rotation of opposing and intersecting tines.

2. A manual cultivator according to claim 1, in which the tines of said implements each have a substantially diamond-shaped cross-section extending longitudinally along each radial tine, the longitudinal diamond axis extending about perpendicular to said central axis, and each tine tapering towards the distal free end while maintaining said diamond-shaped cross-section.

3. A manual cultivator according to claim 2, in which the comminuting implements are removeable and replaceable, in which each said V-shaped bearing means comprises a Y-shaped bearing head having paired opposite obtusely-extending bearings, in which one of each paired implements is located on one bearing for one of said central axis and the other of each paired implements is located on the opposite bearing for another of said central axis, and in which said handle includes a forked head extending with each prong of said forked head having said bearing head mounted on and extending from the prong's terminal end.

4. A manual cultivator according to claim 1, in which the comminuting implements are removeable and replaceabl,e in which each said V-shaped bearing means comprises a Y-shaped bearing head having paired opposite obtusely-extending bearings, in which one of each paired implements is located on one bearing for one of said central axis and the other of each paired implements is located on the opposite bearing for another of said central axis, and in which said handle includes a forked head extending with each prong of said forked head having said bearing head mounted on and extending from the prong's terminal end.

(References on following page)

References Cited

UNITED STATES PATENTS

| | | | |
|---|---|---|---|
| 188,815 | 3/1877 | Nichols | 172—540 |
| 1,714,852 | 5/1929 | Denitson | 172—349 |
| 2,882,982 | 4/1959 | Hobbs | 172—522 |

FOREIGN PATENTS

| | | | |
|---|---|---|---|
| 118,059 | 2/1944 | Australia | 172—378 |
| 11,779 | 1847 | Great Britain | 172—540 |
| 434,811 | 9/1935 | Great Britain | 172—520 |
| 6810893 | 2/1970 | Netherlands | 172—520 |

ROBERT E. PULFREY, Primary Examiner

C. W. HANOR, Assistant Examiner

U.S. Cl. X.R.

172—349, 520, 540